US012664889B2

(12) United States Patent
Kawakami

(10) Patent No.: US 12,664,889 B2
(45) Date of Patent: Jun. 23, 2026

(54) CONTROL APPARATUS, CONTROL METHOD, AND NON-TRANSITORY COMPUTER-READABLE MEDIUM

(71) Applicant: NEC Corporation, Tokyo (JP)

(72) Inventor: Kazuya Kawakami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/273,445

(22) PCT Filed: Dec. 17, 2021

(86) PCT No.: PCT/JP2021/046865
§ 371 (c)(1),
(2) Date: Jul. 20, 2023

(87) PCT Pub. No.: WO2022/219848
PCT Pub. Date: Oct. 20, 2022

(65) Prior Publication Data
US 2024/0144816 A1 May 2, 2024

(30) Foreign Application Priority Data

Apr. 13, 2021 (JP) ................................. 2021-067690

(51) Int. Cl.
*G08G 1/07* (2006.01)
*G06T 7/20* (2017.01)
(Continued)

(52) U.S. Cl.
CPC .................. *G08G 1/07* (2013.01); *G06T 7/20* (2013.01); *G06V 20/54* (2022.01); *G06V 40/10* (2022.01);
(Continued)

(58) Field of Classification Search
None
See application file for complete search history.

(56) References Cited

U.S. PATENT DOCUMENTS 7,688,222 B2 * 3/2010 Peddie ............. G08G 1/096783
116/63 P
9,424,749 B1 * 8/2016 Reed ...................... G08G 1/166
(Continued)

FOREIGN PATENT DOCUMENTS

JP H11-184521 A 7/1999
JP 2008-052464 A 3/2008
(Continued)

OTHER PUBLICATIONS

International Search Report for PCT Application No. PCT/JP2021/046865, mailed on Feb. 22, 2022.
(Continued)

*Primary Examiner* — Muhammad Adnan
(74) *Attorney, Agent, or Firm* — Sughrue Mion, PLLC

(57) ABSTRACT

A control apparatus (10) includes an image processing unit (110), a movement route estimation unit (120), and a control unit (140). The image processing unit (110) detects occurrence of a specific event by processing an image. The movement route estimation unit (120) determines an object being a person and/or a vehicle being involved in the specific event, and estimates an estimated movement route of the object. The control unit (140) controls a device in order to guide the object according to the estimated movement route. The device to be controlled herein is, for example, a traffic light included in a traffic system.

15 Claims, 10 Drawing Sheets

(51) Int. Cl.

| | |
|---|---|
| *G06V 20/54* | (2022.01) |
| *G06V 40/10* | (2022.01) |
| *G08G 1/017* | (2006.01) |

(52) U.S. Cl.
CPC ............... *G06T 2207/30196* (2013.01); *G06T 2207/30236* (2013.01); *G06V 2201/08* (2022.01); *G08G 1/0175* (2013.01)

(56) References Cited

U.S. PATENT DOCUMENTS

| | | | | |
|---|---|---|---|---|
| 10,733,893 | B1 * | 8/2020 | Swan | G08G 1/166 |
| 11,302,186 | B2 * | 4/2022 | Shi | G06V 20/584 |
| 11,355,006 | B1 * | 6/2022 | Cho | G08G 1/096708 |
| 11,887,386 | B1 * | 1/2024 | Davis | G07C 5/0816 |
| 2015/0233727 | A1 * | 8/2015 | Roelle | G08G 1/09626 |
| | | | | 701/533 |
| 2015/0243170 | A1 * | 8/2015 | Collar | G08G 1/017 |
| | | | | 340/933 |
| 2017/0162051 | A1 | 6/2017 | Sato | |
| 2018/0061230 | A1 * | 3/2018 | Madigan | G08G 1/205 |
| 2018/0211117 | A1 * | 7/2018 | Ratti | G06F 15/76 |
| 2018/0211532 | A1 * | 7/2018 | Aoki | G08G 1/096725 |
| 2019/0012912 | A1 * | 1/2019 | Kim | B60K 35/00 |
| 2019/0082099 | A1 * | 3/2019 | Imomoto | H04N 23/61 |
| 2019/0287394 | A1 * | 9/2019 | Aoude | G06N 20/10 |
| 2019/0384319 | A1 * | 12/2019 | Sakagami | G01C 21/3602 |
| 2020/0101917 | A1 * | 4/2020 | Kumar | G08G 1/162 |
| 2020/0193734 | A1 * | 6/2020 | Kamata | G06V 20/56 |
| 2020/0242922 | A1 * | 7/2020 | Dulberg | G08G 1/166 |
| 2020/0265719 | A1 * | 8/2020 | Swan | G08G 1/166 |
| 2020/0298842 | A1 * | 9/2020 | Takamatsu | B60W 30/09 |
| 2021/0014643 | A1 * | 1/2021 | Kuroda | H04W 4/026 |
| 2021/0221369 | A1 * | 7/2021 | Kashefy | B60Q 1/444 |
| 2022/0189300 | A1 * | 6/2022 | Yu | B60K 35/28 |
| 2022/0208001 | A1 * | 6/2022 | Kijashka | G09F 19/20 |
| 2022/0415053 | A1 * | 12/2022 | Ishikawa | G06V 10/22 |
| 2023/0326336 | A1 * | 10/2023 | Li | G08G 1/005 |
| | | | | 340/907 |
| 2024/0242603 | A1 * | 7/2024 | Aminaka | G08G 1/0133 |

FOREIGN PATENT DOCUMENTS

| | | |
|---|---|---|
| JP | 2008-309636 A | 12/2008 |
| JP | 2013-117807 A | 6/2013 |
| JP | 2016-130931 A | 7/2016 |
| JP | 2018-156667 A | 10/2018 |
| JP | 2020-108106 A | 7/2020 |

OTHER PUBLICATIONS

JP Office Action for JP Application No. 2023-514330, mailed on May 7, 2024 with English Translation.

\* cited by examiner

CONTROL APPARATUS, CONTROL METHOD, AND NON-TRANSITORY COMPUTER-READABLE MEDIUM

This application is a National Stage Entry of PCT/JP2021/046865 filed on Dec. 17, 2021, which claims priority from JP Patent Application 2021-067690 filed on Apr. 13, 2021, the contents of all of which are incorporated herein by reference, in their entirety.

TECHNICAL FIELD

The present invention relates to a control apparatus, a control method, and a program.

BACKGROUND ART

In recent years, image processing has been used in various fields. For example, Patent Document 1 describes that license number information is received from a vehicle recognition camera installed on a road, and a traveling range of a wanted vehicle registered in advance is predicted by using the license number information. Patent Document 1 further describes that traveling of the wanted vehicle is caused to be delayed by controlling a traffic light in the traveling range.

Patent Document 2 describes extracting an image satisfying a condition necessary for verifying a specific traffic violation from a plurality of images continuously captured from a single camera.

Further, Patent Document 3 describes that, when position information of a surveillance camera 2 photographing a getaway vehicle is acquired, an image by the surveillance camera 2 that has acquired the position information is analyzed and an escaping direction of the getaway vehicle is determined.

RELATED DOCUMENT

Patent Document

Patent Document 1: Japanese Patent Application Publication No. 2008-52464
Patent Document 2: Japanese Patent Application Publication No. 2016-130931
Patent Document 3: Japanese Patent Application Publication No. 2020-108106

SUMMARY OF INVENTION

Technical Problem

When a direction of movement of a vehicle or a person can be determined, a person who is familiar with road conditions surrounding the vehicle or person can estimate a movement route of the vehicle or person. However, there is a possibility that an actual movement route of the vehicle or person may be different from the estimated movement route.

An example of an object of the present invention is to increase a possibility that an actual movement route of a vehicle or a person coincides with an estimated movement route.

Solution to Problem

According to a first aspect of the present invention, there is provided a control apparatus including: an image processing unit that detects occurrence of a specific event by processing an image; a movement route estimation unit that determines an object being a person and/or a vehicle being involved in the specific event and estimates an estimated movement route of the object; and a control unit that controls a device in order to guide the object according to the estimated movement route.

Further, according to the present invention, there are also provided a control method to be performed by the above-described control apparatus and a program necessary for achieving the above-described control apparatus.

Advantageous Effects of Invention

According to the present invention, there is an increased possibility that an actual movement route of a vehicle or a person coincides with an estimated movement route.

DESCRIPTION OF EMBODIMENTS

Figure 1:
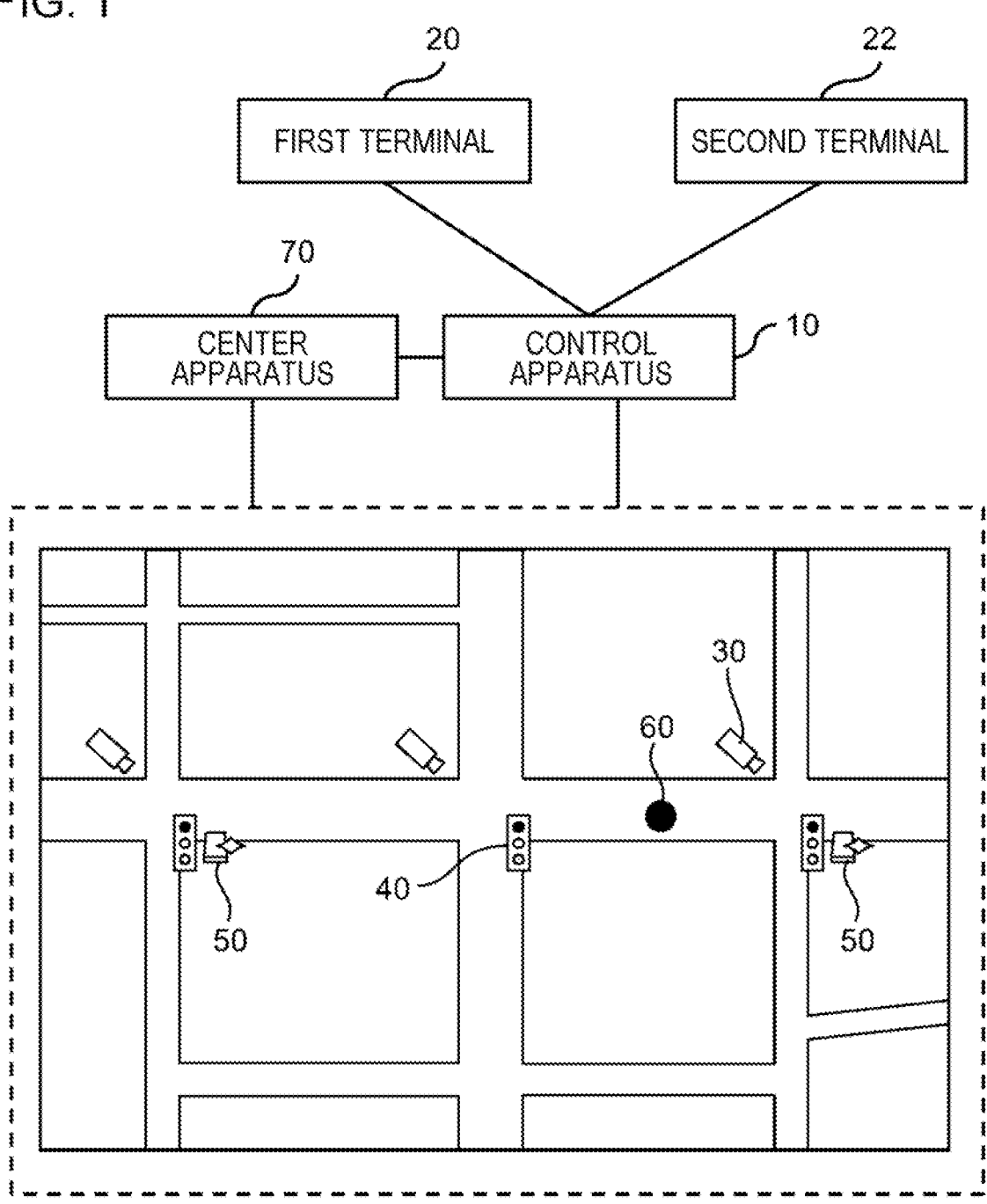
FIG. 1 It is a diagram for explaining a usage environment of a control apparatus according to an example embodiment.

Hereinafter, an example embodiment of the present invention will be explained with reference to the drawings. In all the drawings, the same components are denoted by the same reference numerals, and explanation thereof will be omitted as appropriate.

FIG. 1 is a diagram for explaining a usage environment of a control apparatus 10 according to an example embodiment. The control apparatus 10 is used together with a plurality of imaging apparatuses 30, a plurality of first devices 40, and a center apparatus 70 of a traffic control system.

The imaging apparatus 30 photographs a vehicle or a person passing through a road at a predetermined frame rate, and transmits a generated image to the control apparatus 10. The first device 40 is a device arranged in a town, for example, at least a part (e.g., a traffic light) of a traffic control system that controls movement of a person and/or a vehicle. Note that the imaging apparatus 30 may perform imaging while a specific event to be described later may occur. For example, in a case where an intersection is included in an imaging range of the imaging apparatus 30 and a traffic light is installed at the intersection, the imaging apparatus 30 may acquire control information of the traffic light from the center apparatus 70, and set a period during which imaging is performed by using the control information. As an example, the imaging apparatus 30 performs photographing while the traffic light is red. Such control is enabled by acquiring information indicating a lighting state of the traffic light from the center apparatus 70.

The center apparatus 70 controls at least a part of the first devices 40 and thereby controls traffic. The center apparatus 70 stores a congestion state of each road and an average movement velocity of each point. The center apparatus 70 may further store an estimated value of a time required to move between the two points (hereinafter referred to as a predicted required time).

The control apparatus 10 detects occurrence of a predetermined event (hereinafter, referred to as a "specific event") by processing an image acquired from the imaging apparatus 30. The specific event is, for example, a traffic violation, but is not limited thereto. In addition, the control apparatus 10 determines a person and/or a vehicle (hereinafter, referred to as an object 60) involved in the specific event. When the object 60 is a vehicle, the control apparatus 10 reads an identifier (hereinafter, referred to as license plate information) described on a license plate of the vehicle. When the object 60 is a person, the control apparatus 10 generates a feature amount of the person (for example, a feature amount of a face and/or clothes). Furthermore, the control apparatus 10 estimates an estimated movement route of the object 60, and controls the first device 40 via the center apparatus 70 in order to guide the object 60 according to the estimated movement route. This control increases a probability that the object 60 moves according to the estimated movement route.

In addition, a plurality of second apparatuses 50 are arranged in the town. The second apparatus 50 is, for example, a light emitting apparatus such as a rotating lamp, a display, or an output apparatus such as a speaker. The control apparatus 10 causes the second apparatus 50 located in the above-described estimated movement route to perform a predetermined output. Thus, a person located around the second apparatus 50 can recognize that a position of the second apparatus 50 is included in the estimated movement route.

In addition, there are a plurality of people to investigate the object 60 (hereinafter referred to as "investigation executors") in the town. The investigation executor is, for example, a police officer, but may also be a private security officer. Each of the plurality of investigation executors possesses a portable first terminal 20. The first terminal 20 is a smartphone, a tablet terminal, or a wearable terminal. The control apparatus 10 transmits, to at least a part of the first terminals 20, information related to the object 60 and information related to an estimated escape route.

At this time, the control apparatus 10 may set a specific point included in the estimated escape route to a position (hereinafter, referred to as a staying point) at which the object 60 needs to stay. In this case, the control apparatus 10 controls at least one of the first devices 40 via the center apparatus 70 in such a way that the object 60 stays at the staying point. Further, the control apparatus 10 sets a recommended movement route from a current position of the investigation executor to the staying point, and transmits the recommended movement route to the first terminal 20 possessed by the investigation executor.

In addition, there are a plurality of people (hereinafter referred to as "cooperators") to cooperate with investigation executors in the town. The cooperator is, for example, a civilian. A second terminal 22 is possessed by the cooperator. The control apparatus 10 determines a cooperator near the staying point, and transmits information indicating the staying point to the second terminal 22 of the cooperator(s). Thus, the cooperator can recognize the position of the staying point. At least a part of the cooperators may not have the second terminal 22. In this case, the control apparatus 10 controls the second apparatus 50, thereby notifying the cooperator.

Figure 2:
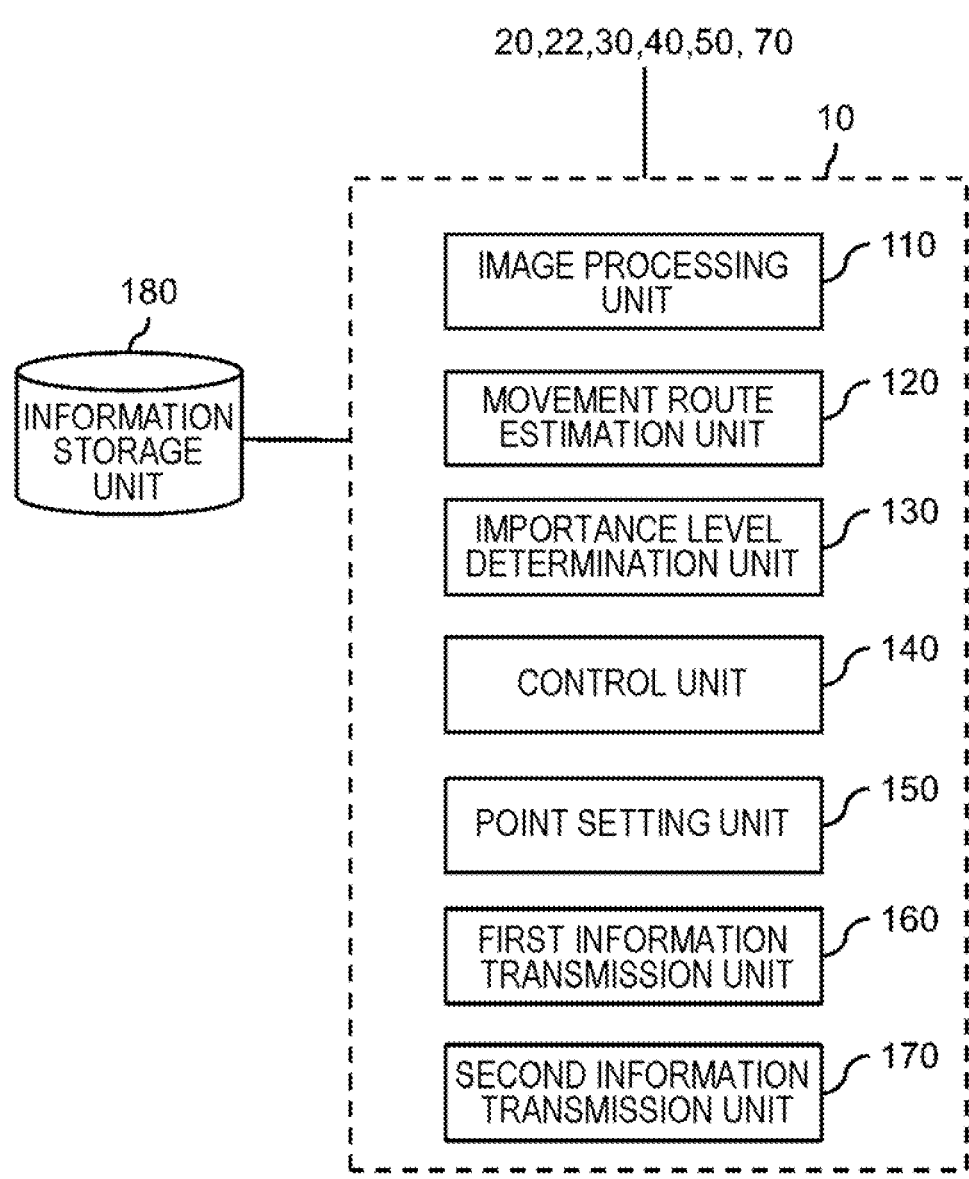
FIG. 2 It is a diagram illustrating an example of a functional configuration of a control apparatus.

FIG. 2 is a diagram illustrating an example of a functional configuration of the control apparatus 10. The control apparatus 10 includes an image processing unit 110, a movement route estimation unit 120, and a control unit 140. In addition, the control apparatus 10 can acquire various kinds of information stored in the center apparatus 70 and various kinds of information stored in the information storage unit 180.

The information storage unit 180 stores various kinds of information necessary for processing performed by the control apparatus 10. An example of the information stored in the information storage unit 180 is map information, information related to each of the plurality of investigation executors, information related to each of the plurality of cooperators, license plate information of an arrangement vehicle, and a feature amount of a suspect of a crime. The information related to the investigation executor is, for example, a name, information necessary for communicating with the first terminal 20, and a current position. The information related to the collaborator is also, for example, a name, information necessary for communicating with the second terminal 22, and a current position. Note that the information storage unit 180 may be a part of the control apparatus 10.

The image processing unit 110 detects the occurrence of a specific event by processing the image generated by the imaging apparatus 30 in real time. The specific event is, for example, a traffic violation, but may be "presence of the arrangement vehicle and/or the suspect", or may be a collision between a vehicle and a vehicle, a collision between a vehicle and a person or an animal, or an excessive interruption of a vehicle. When the specific event is a traffic violation, the image processing unit 110 detects the occurrence of a traffic violation by processing a plurality of temporally consecutive images (for example, a plurality of frame images constituting a moving image) or comparing the image generated by the imaging apparatus 30 with an image at a normal time. A traffic violation serving as a particular event includes, but is not limited to, for example, signal ignoring, crossing a stop line, a stop sign violation, a right turn (or left turn) prohibition violation, a speed violation, and the like. In addition, when the specific event is "the presence of the arrangement vehicle and/or the suspect", the image processing unit 110 determines that the specific event has occurred when the license plate information (or the feature amount of the object 60) described above is stored in the information storage unit 180.

Further, the image processing unit 110 may continue to process the images generated by the plurality of imaging apparatuses 30 in real time, and may continue to recognize the current position of the object 60 by using the processing result and the license plate information (or the feature amount of the object 60).

The movement route estimation unit 120 determines the above-described object 60 and estimates the estimated movement route of the object 60. For example, the movement route estimation unit 120 determines a plurality of escape possible routes by using an occurrence point of a specific event, an occurrence time thereof, and a movement direction of the object 60. Then, the movement route estimation unit 120 selects the estimated movement route from the plurality of escape possible routes by using a congestion state and an average movement velocity of each road, which is acquired from the center apparatus 70. These processing may be performed by using a rule base, or may be performed by using a model generated by machine learning.

The control unit 140 controls a device (for example, the first device 40) installed in the town in order to guide the object 60 according to the estimated movement route. For example, the control unit 140 continues to acquire the current position of the object 60 from the image processing unit 110. When the current position of the object 60 approaches an intersection, the control unit 140 controls a traffic light (an example of the first device 40) arranged at the intersection in such a way that the object 60 travels along the estimated movement route at the intersection. For example, when the estimated movement route indicates that the object 60 travels straight through the intersection, the control unit 140 controls the traffic light in such a way that the object 60 can travel straight (or can only travel straight) at a timing when the object 60 reaches the intersection. When the estimated movement route indicates turning right (or turning left) at the intersection, the control unit 140 controls the traffic light in such a way that the object 60 turns right (or turns left) (or can only turn right (or turn left) at the timing when the object 60 reaches the intersection.

The control apparatus 10 further includes an importance level determination unit 130, a point setting unit 150, a first information transmission unit 160, and a second information transmission unit 170.

The importance level determination unit 130 determines an importance level of the specific event.

For example, the image processing unit 110 may generate information necessary for generating the importance level by processing the image generated by the imaging apparatus 30. An example of this information is the above-described license plate information and feature amount of the object 60 (for example, a person). In this case, when the license plate information (or the feature amount) generated by the image processing unit 110 is stored in the information storage unit 180, the importance level determination unit 130 sets the importance level of the specific event to be higher than a criterion value, and otherwise sets the importance level of the specific event to be the criterion value. In addition, the importance level determination unit 130 sets the importance level of the specific event to be higher than the criterion value when the feature amount of the person generated by the image processing unit 110 is stored in the information storage unit 180, and sets the importance level of the specific event to be the criterion value otherwise.

The image processing unit 110 may directly generate the importance level. In this case, the importance level determination unit 130 acquires this importance level. For example, when the specific event is a traffic violation, the information storage unit 180 may store the importance level in advance for each type of the traffic violation. The image processing unit 110 determines a type of the traffic violation and reads the importance level according to the type from the information storage unit 180, thereby generating the importance level. At this time, depending on the type of the traffic violation, a degree of the traffic violation (for example, a magnitude of excess velocity in a case of a velocity violation) may be determined. In this case, the importance level increases as the degree of traffic violation increases.

The control unit 140 may control the above-described device (for example, the first device 40) only when at least one of the importance level and the estimated movement route satisfies a criterion.

For example, the control unit 140 may control the above-described device (for example, the first device 40) only when the importance level is equal to or higher than the criterion. In addition, the control unit 140 may control the above-described device only when a predetermined region is included in the estimated movement route. Herein, information for determining a predetermined region is stored in the information storage unit 180. The predetermined region is, for example, a region in which safety is particularly important, or a region in which there is a large number of people (for example, a high population density). Furthermore, the control unit 140 may control the above-described device only when the importance level is equal to or greater than the criterion and a predetermined region is included in the estimated movement route.

In a case where a predetermined region is included in the estimated movement route, the movement route estimation unit 120 may reset the estimated movement route in such a way as to bypass the region. In this case, the control unit 140 controls the first device 40 in such a way that the target 60 bypasses the predetermined region.

The point setting unit 150 sets the above-described staying point on the estimated movement route. For example, the point setting unit 150 sets, as a staying point, an intersection in which a required time from a position where a specific event has occurred is within a criterion. The setting of the staying point may be performed, for example, on a rule basis or by using a model generated by machine learning.

The control unit 140 controls the device (for example, the first device 40) in such a way that movement of the object 60 is delayed (or the object 60 is stayed) at the staying point as necessary. For example, the control unit 140 continues to acquire the current position of the object 60 from the image processing unit 110. Then, when the current position of the object 60 approaches the staying point, the control unit 140 causes a signal located at the staying point or a traffic light located immediately after the staying point in the estimated movement route, to display travel prohibition.

Further, the control unit 140 selects the second apparatus 50 in which a position based on the staying point satisfies a criterion. As an example, when the staying point is an intersection and the second apparatus 50 is installed at the intersection, the control unit 140 selects the second apparatus 50. As another example, the control unit 140 selects the second apparatus 50 in a range of a predetermined distance from the staying point (which may be in the front or in the rear) in the estimated movement route. Then, the control unit 140 performs processing for causing the selected second apparatus 50 to perform a predetermined output. For example, the control unit 140 transmits a signal indicating that a predetermined output is to be performed to the second apparatus 50. In this way, a person who is near the staying point can recognize that a location is set as the staying point.

The first information transmission unit 160 selects a person to investigate the current object 60 from a plurality of investigation executors. For example, the first information transmission unit 160 estimates a time at which the object 60 reaches the staying point. In addition, the first information transmission unit 160 reads the current position of each of the plurality of investigation executors from the information storage unit 180. Then, the first information transmission unit 160 uses the current position and the information stored in the center apparatus 70 and selects an investigation executor who is predicted to be able to reach the staying point by the estimated time.

Then, the first information transmission unit 160 generates information (hereinafter, referred to as "recommended route information") indicating a recommended movement route from a current position of a selected investigation executor to the staying point by using the current position of the investigation executor, the position of the staying point, the average movement velocity of the investigation executor, and the information (hereinafter, referred to as information indicating a congestion state of a sidewalk) stored in the center apparatus 70, and transmits the recommended route information to the first terminal 20 of the investigation executor. At this time, the first information transmission unit 160 may transmit information indicating the estimated movement route of the object 60 and information determining the object 60 to the first terminal 20. The information determining the object 60 is, for example, license plate information and/or an image acquired by trimming the object 60 from the image generated by the imaging apparatus 30.

The second information transmission unit 170 acquires, from the information storage unit 180, a current position of each of the plurality of cooperators described above, i.e., a plurality of persons to cooperate with the investigation executor. Then, the second information transmission unit 170 determines a person whose current position satisfies a criterion from the plurality of cooperators, and transmits at least one of information indicating the position of the staying point and information related to the object 60 to the second terminal 22 of the determined cooperator.

Herein, the above-described criterion related to a current position of the cooperator is set based on, for example, an estimated movement route. As an example, the second information transmission unit 170 calculates a time at which the object 60 is predicted to reach each point on the estimated movement route by using the information stored in the center apparatus 70. Then, the second information transmission unit 170 selects, among the plurality of cooperators, a person estimated to be able to reach at any one of points on the estimated movement route earlier than the object 60. As another example, the second information transmission unit 170 may select a person within a predetermined distance (for example, within 100 m) from the staying point among the plurality of cooperators. As yet another example, the second information transmission unit 170 may select a person estimated to be able to reach the staying point earlier than the object 60 among the plurality of cooperators.

"Information related to the object 60" transmitted to the second terminal 22 is information for determining the object 60. An example of the information for determining the object is license plate information and/or an image acquired by trimming the object 60 from the image generated by the imaging apparatus 30.

Figure 3:
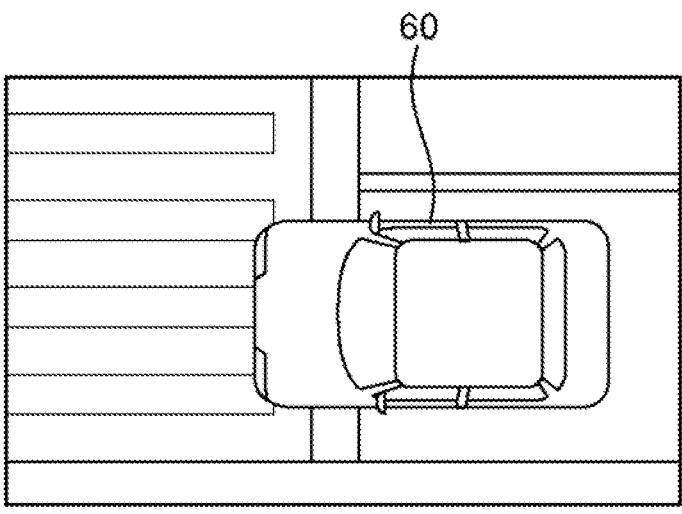
FIG. 3 It is a diagram illustrating an example of an image generated by an imaging apparatus.

FIG. 3 is a diagram illustrating an example of an image generated by the imaging apparatus 30. In the example illustrated in this figure, the imaging apparatus 30 includes an intersection in the imaging range. A stop position of the vehicle, which is the object 60, is beyond the stop line. The image processing unit 110 detects the violation by processing the image.

Figure 4:
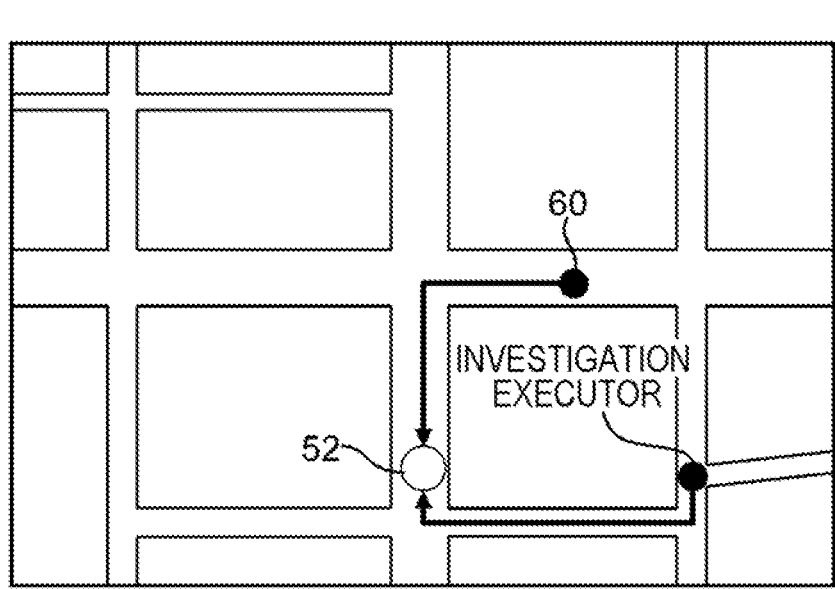
FIG. 4 It is a diagram illustrating an example of a screen displayed on a first terminal.

FIG. 4 is a diagram illustrating an example of a screen displayed on the first terminal 20. In the example illustrated in this figure, the first terminal 20 displays a map. The map includes the current position of the object 60, the estimated movement route of the object 60, a staying point 62, and the current position and the recommended movement route of the investigation executor who possesses the first terminal 20. Then, the current position of the object 60 and the current position of the investigation executor are repeatedly updated. Accordingly, the estimated movement route and the recommended movement route may also be updated.

Figure 5:
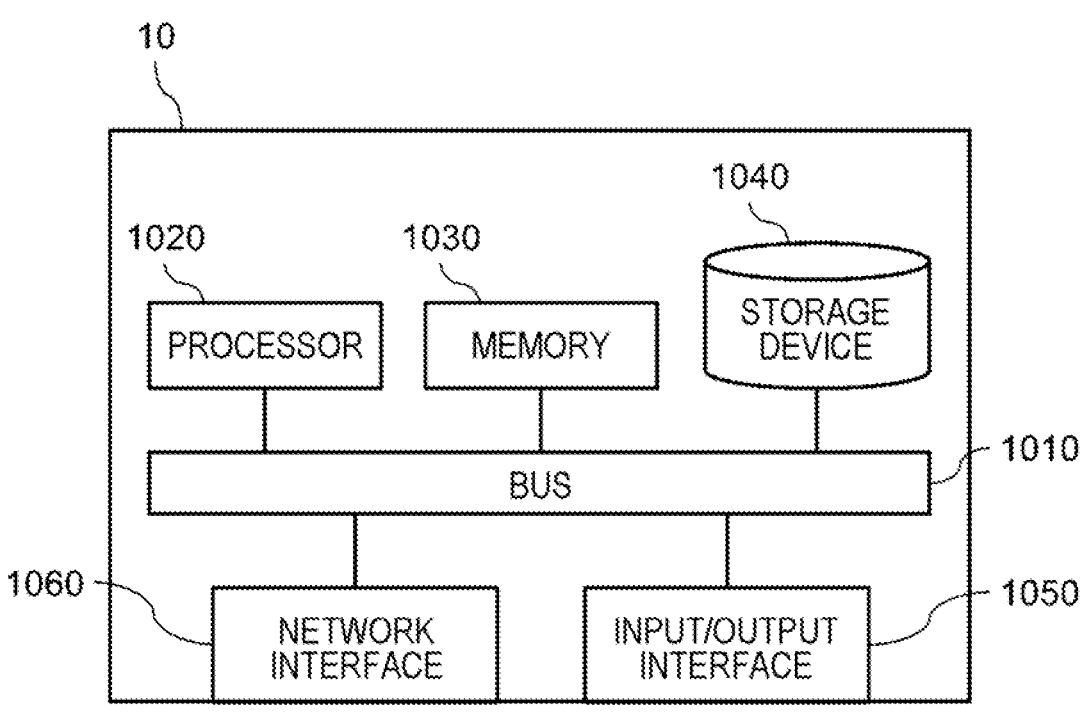
FIG. 5 It is a diagram illustrating an example of a hardware configuration of the control apparatus.

FIG. 5 is a diagram illustrating an example of a hardware configuration of the control apparatus 10. The control apparatus 10 includes a bus 1010, a processor 1020, a memory 1030, a storage device 1040, an input/output interface 1050, and a network interface 1060.

The bus 1010 is a data transmission line through which the processor 1020, the memory 1030, the storage apparatus 1040, the input/output interface 1050, and the network interface 1060 transmit and receive data to and from each other. However, the method of connecting the processor 1020 and the like to each other is not limited to a bus connection.

The processor 1020 is a processor achieved by a Central Processing Unit (CPU), a Graphics Processing Unit (GPU), or the like.

The memory 1030 is a main storage device achieved by a Random Access Memory (RAM) or the like.

The storage device 1040 is an auxiliary storage device achieved by a Hard Disk Drive (HDD), a Solid State Drive (SSD), a memory card, a Read Only Memory (ROM), or the like. The storage device 1040 stores a program module that achieves each function of the control apparatus 10 (for example, the image processing unit 110, the movement route estimation unit 120, the importance level determination unit 130, the control unit 140, the point setting unit 150, the first information transmission unit 160, and the second information transmission unit 170). When the processor 1020 reads and executes the program modules on the memory 1030, the functions associated to the program modules are achieved.

The input/output interface 1050 is an interface for connecting the control apparatus 10 and various input/output devices.

The network interface 1060 is an interface for connecting the control apparatus 10 to a network. The network is, for example, a Local Area Network (LAN) or a Wide Area Network (WAN). A method by which the network interface 1060 connects to the network may be a wireless connection or a wired connection. The control apparatus 10 may communicate with the first terminal 20, the second terminal 22, the imaging apparatus 30, the second apparatus 50, and the center apparatus 70 via the network interface 1060.

Figure 6:
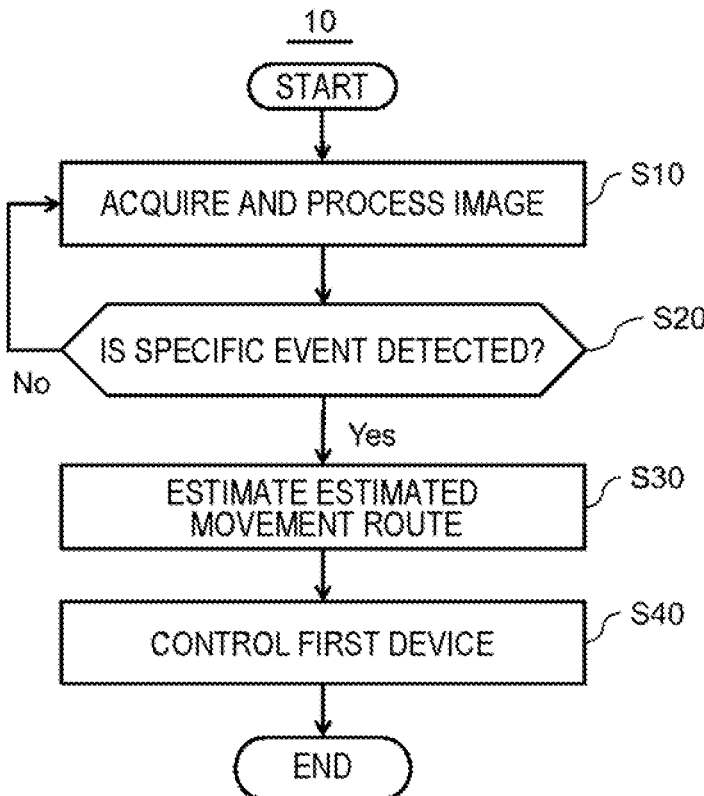
FIG. 6 It is a flowchart illustrating a first example of processing performed by the control apparatus.

FIG. 6 is a flowchart illustrating a first example of processing performed by the control apparatus 10. The imaging apparatus 30 generates an image at a predetermined frame rate. The frame rate is, for example, 0.5 frames/second or more and 10 frames/second or less. The plurality of imaging apparatuses 30 transmit images to the control apparatus 10 in real time. Each time an image is acquired, the control apparatus 10 performs processing illustrated in this figure. Therefore, in a case where the imaging apparatus 30 performs photographing while the traffic light is red, the processing illustrated in this figure is performed on the image when the signal is a red signal.

When the specific event is "the stop position of the vehicle or the person is beyond the stop line", an image processing apparatus may be provided between the imaging apparatus 30 and the control apparatus 10. The image processing apparatus may determine in real time whether or not the image indicates that the stop position of the vehicle or the person is beyond the stop line, and transmit the image to the control apparatus 10 only when the stop position is beyond the stop line.

Further, the processing illustrated in this figure may not be performed at a specific time, a specific time period, and a specific weather condition. This particular time, particular time period, and particular weather conditions are, for example, timing/weather conditions (e.g., rain) at which roads of the town targeted by the control apparatus 10 are expected to become congested. This timing may be, for example, a commuting/school time zone, or may be a time when a special event is being intervened.

The image processing unit 110 of the control apparatus 10 processes the image when the image is acquired. The processing performed herein is at least processing of detecting a specific event. Further, the image processing unit 110 generates other necessary information by processing the image. A specific example of the information generated herein is as explained with reference to FIG. 2 (step S10).

Further, the image processing unit 110 causes the information storage unit 180 to store the acquired image in association with identification information of the imaging apparatus 30 that has generated the image and a generation time of the image. At this time, the image processing unit 110 may cause the information storage unit 180 to store the image in which the specific event is detected, in association with information (for example, a flag) indicating the specific event and a type of the specific event (for example, a content of the traffic violation). As a result, a user of the control apparatus 10 can easily search for an image in which a specific event is detected, and examine the specific event by using the retrieved image. In addition, in a case where the specific event is a traffic violation, a police officer or the center apparatus 70 can process the traffic violation (processing of notifying a person who has committed a violation of payment of a fine).

When the image processing unit 110 detects the specific event (step S20: Yes), the movement route estimation unit 120 estimates the estimated movement route (step S30). An example of a method of estimating an estimated movement route is as explained with reference to FIG. 2.

Then, the control unit 140 controls the first device 40 to be in a state different from the normal state in such a way that the object 60 moves along the estimated movement route (step S40). An example of the control performed herein is as explained with reference to FIG. 2. When the type of the specific event satisfies a criterion, the control unit 140 may operate the second apparatus 50 within a predetermined range from a location where the specific event is detected, instead of controlling the first device 40 or in addition to the control of the first device 40. Such control is performed, for example, when the specific event is "the vehicle as the object 60 protrudes from the lane".

Thereafter, the control unit 140 may determine the imaging apparatus 30 including the estimated movement route in an imaging range, and change a photographing mode of the imaging apparatus 30. For example, the control unit 140 may increase the frame rate of the imaging apparatus 30, or may increase a magnification at a time of photographing within a range in which the road serving as the estimated movement route does not deviate from the imaging range. The control unit 140 may continue to acquire the current position of the target 60 from the image processing unit 110, and may further control the first device 40 depending on the current position. As an example, when it is desired to slow down the movement velocity of the object 60 (for example, when the movement velocity of the object 60 is faster than expected), the first device 40 is controlled in such a way that the required time in the estimated movement route becomes longer. When it is desired to increase the movement velocity of the object 60 (for example, when the movement velocity of the object 60 is slower than expected), the first device 40 is controlled in such a way that the required time in the estimated movement route is shortened. Note that this processing may be performed in each of the examples of the second example and the subsequent examples to be described later.

Further, the movement route estimation unit 120 may periodically update the estimated movement route by using the current position of the object 60 and a previous movement history. In this case, the control unit 140 updates the contents of the control illustrated in step S40 each time the estimated movement route is updated.

After a predetermined period of time has elapsed, the control unit 140 ends the control illustrated in step S40.

Figure 7:
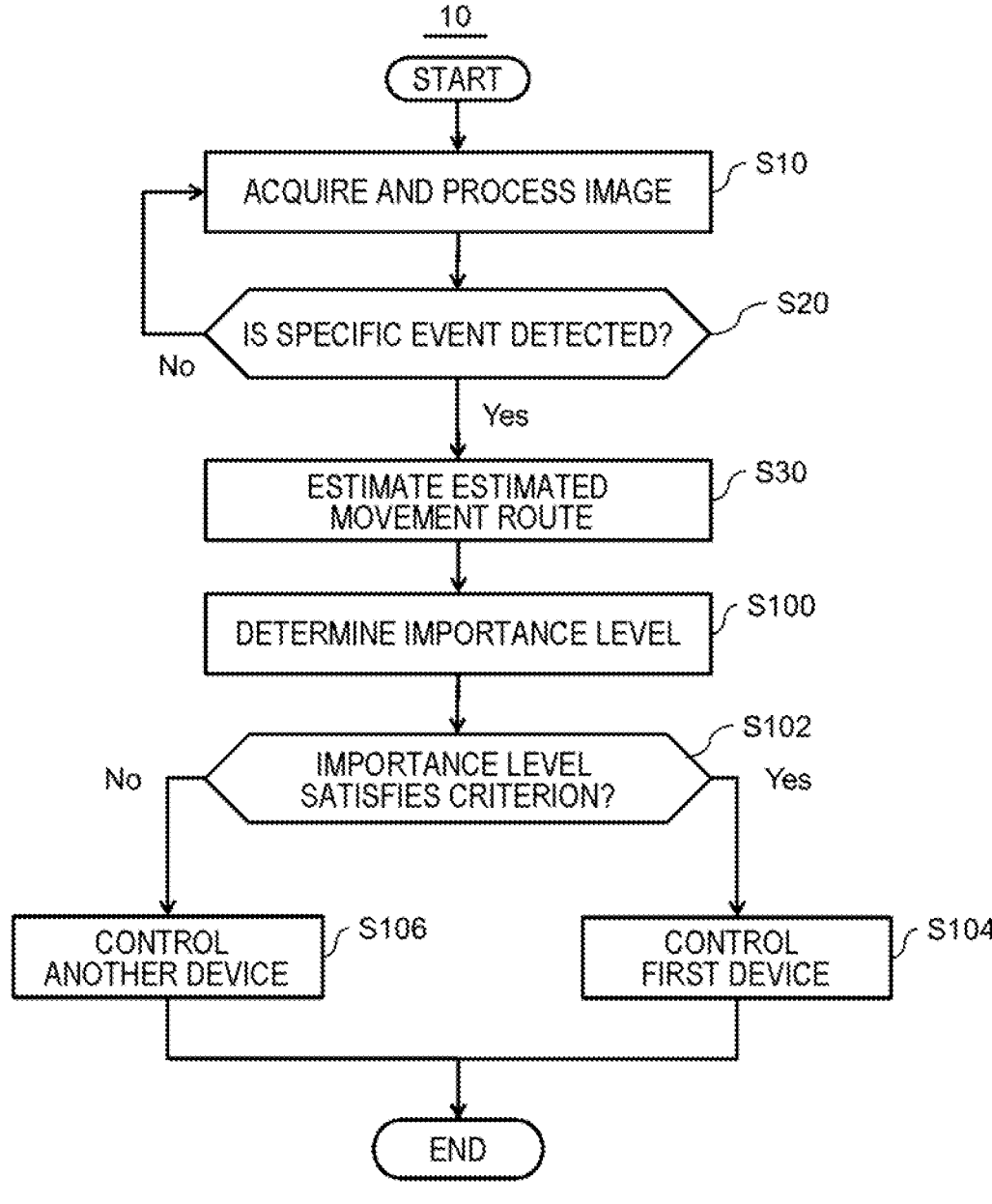
FIG. 7 It is a flowchart illustrating a second example of the processing performed by the control apparatus.

FIG. 7 is a flowchart illustrating a second example of the processing performed by the control apparatus 10. In this figure, preconditions and steps S10 to S30 are the same as the example illustrated in FIG. 6.

After the movement route estimation unit 120 estimates the estimated movement route (step S30), the importance level determination unit 130 determines an importance level. An example of a method of determining the importance level is as explained with reference to FIG. 2. When the importance level satisfies a criterion, for example, when the importance level exceeds a criterion value (step S102: Yes), the control unit 140 controls the first device 40 in such a way that the object 60 moves along the estimated movement route (step S104). At this time, the control unit 140 may change the control content of the first device 40 depending on a degree of the importance level. For example, the control unit 140 controls the first device 40 in such a way that the movement velocity of the object 60 in the recommended movement route becomes slower as the importance level increases (for example, in such a way as to lengthen a state in which the object 60 cannot travel in a traveling direction at the intersection).

In addition, when the importance level does not satisfy a criterion (step S102: No), the control unit 140 controls a device different from the first device 40 to be controlled in step S104, for example, the second apparatus 50, and causes the second apparatus 50 to perform a predetermined output (step S106). The second apparatus 50 serving as the object 60 is, for example, the second apparatus 50 located within a predetermined range from the point where the specific event has occurred.

According to the example illustrated in this figure, the control apparatus 10 does not control the first device 40 for a minor event, and thus the number of times that a traffic jam or the like occurs is reduced. In addition, since the second apparatus 50 performs output, a person located around the second apparatus 50 and a driver of the vehicle as the object 60 can recognize that a specific event is detected.

In step S106 in FIG. 7, the control unit 140 may control an unmanned aerial vehicle instead of the second device to track the object 60.

Furthermore, the importance level determination unit 130 may update the importance level by using movement of the object 60 while moving on the estimated movement route. This movement is determined, for example, by the image processing unit 110 processing an image including the object 60. For example, the importance level determination unit 130 increases the importance level when the vehicle as the object 60 is meandering, when the number of times of lane changes per unit time is equal to or greater than reference criterion value, or when the velocity of the vehicle is greater than or equal to a criterion value as compared with velocities of other surrounding vehicles. Then, the control unit 140 performs the processing of step S102 and subsequent steps again by using the updated importance level.

Figure 8:
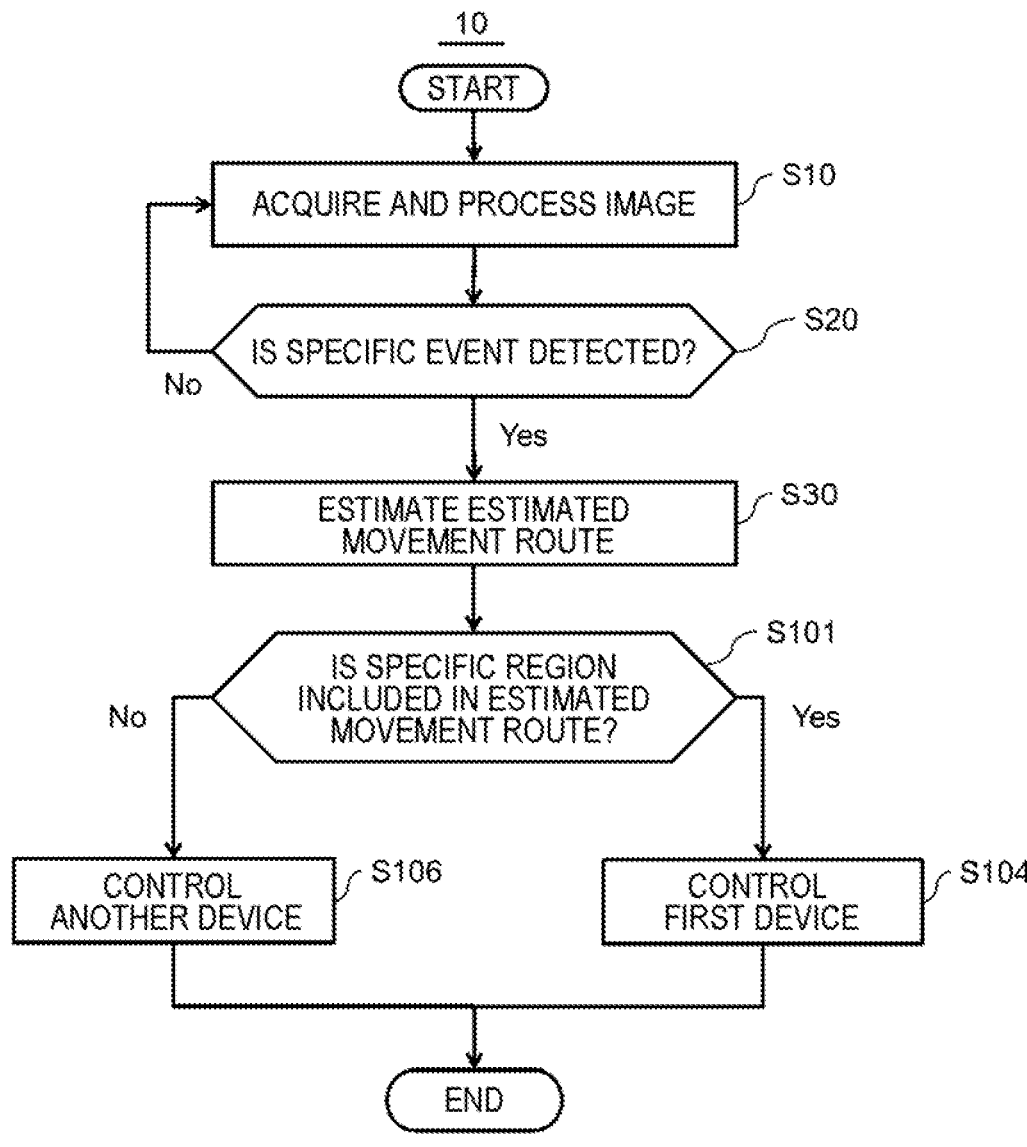
FIG. 8 It is a flowchart illustrating a third example of the processing performed by the control apparatus.

FIG. 8 is a flowchart illustrating a third example of the processing performed by the control apparatus 10. The processing illustrated in this FIG. is the same as the example illustrated in FIG. 7, except that it is determined whether or not a predetermined region is included in the estimated movement route instead of steps S100 to S102 (step S101). Specifically, when a predetermined region is included in the estimated movement route (step S101: Yes), the control unit 140 performs the processing illustrated in step S104. In addition, when a predetermined region is not included in the estimated movement route (step S101: No), the control unit 140 performs the processing illustrated in step S106. As described above, a specific example of the predetermined region is a region in which safety is particularly important, or a region in which there is a large number of people (for example, a high population density).

Note that in step S104 in FIGS. 7 and 8, the control unit 140 may further perform the processing illustrated in steps S200 to S204 that are described later.

Figure 9:
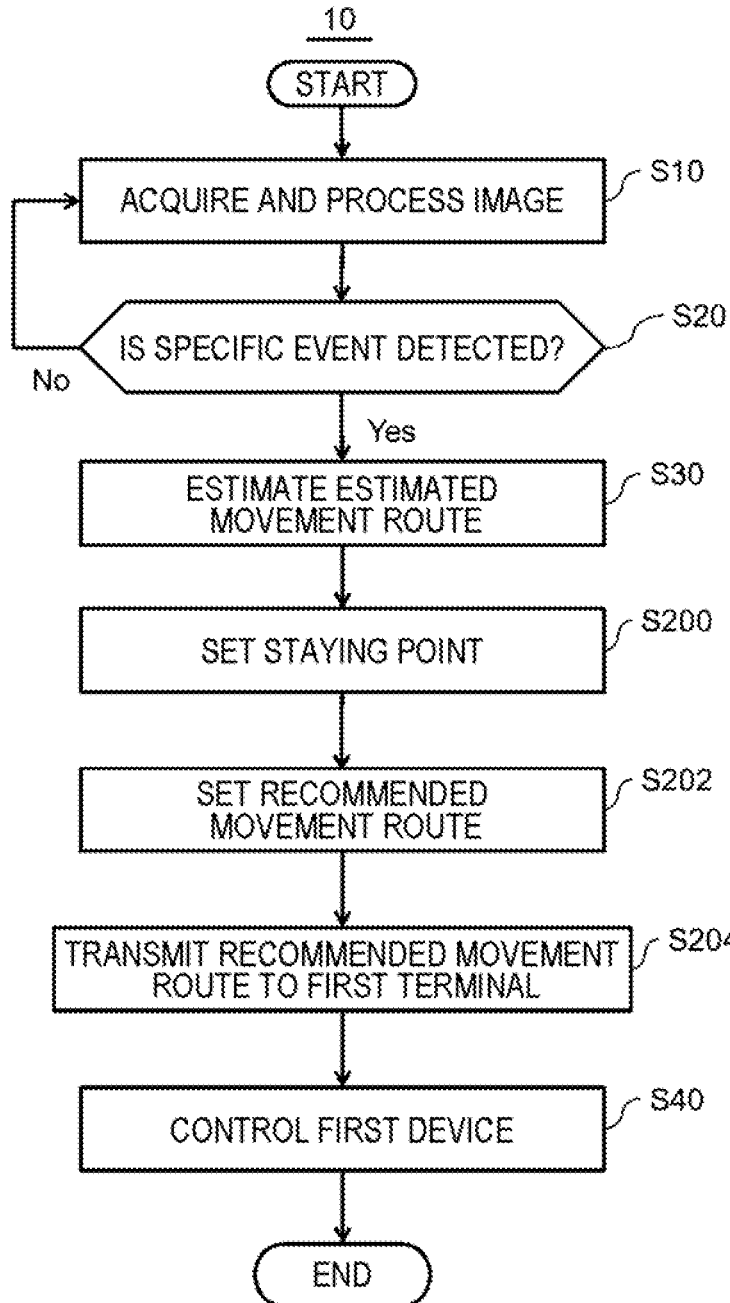
FIG. 9 It is a flowchart illustrating a fourth example of the processing performed by the control apparatus.

FIG. 9 is a flowchart illustrating a fourth example of the processing performed by the control apparatus 10. In the example illustrated in this figure, the control apparatus 10 sets a staying point.

In this figure, steps S10 to S30 are the same as the example illustrated in FIG. 6. After the movement route estimation unit 120 estimates the estimated movement route (step S30), the point setting unit 150 sets a staying point (step S200). An example of a method of setting the staying point is as explained with reference to FIG. 2. Then, the first information transmission unit 160 sets a recommended movement route (step S202). An example of a method of setting a recommended movement route is as explained with reference to FIG. 2. Then, the first information transmission unit 160 transmits recommended route information indicating the recommended movement route to the first terminal 20. At this time, the first information transmission unit 160 may further transmit the estimated route information indicating the estimated movement route and information determining the object 60 (for example, license plate information and/or an image acquired by trimming the object 60 from the image generated by the imaging apparatus 30) to the first terminal 20 (step S204). The first terminal 20 displays the received information.

Herein, the first information transmission unit 160 may cause the first terminal 20 to display a button for inputting information indicating whether or not the investigation executor can respond to the specific event. In this case, the first terminal 20 transmits the input result of this button to the control apparatus 10. Thus, the control apparatus 10 can determine whether or not the investigation executor to respond to the specific event has been confirmed.

In addition, the point setting unit 150 may repeatedly transmit information indicating the current position of the object 60 to the first terminal 20. In this case, the first terminal 20 repeatedly updates the information indicating the current position of the object 60.

Thereafter, the movement route estimation unit 120 controls the first device 40 in the same manner as the example illustrated in FIG. 6 (step S40).

Thereafter, the first information transmission unit 160 may continue to acquire the current position of the object 60 from the image processing unit 110, and may further notify the first terminal 20 according to the current position. For example, when the movement velocity of the object 60 is faster or slower than expected, the first information transmission unit 160 transmits information indicating this to the first terminal 20.

Figure 10:
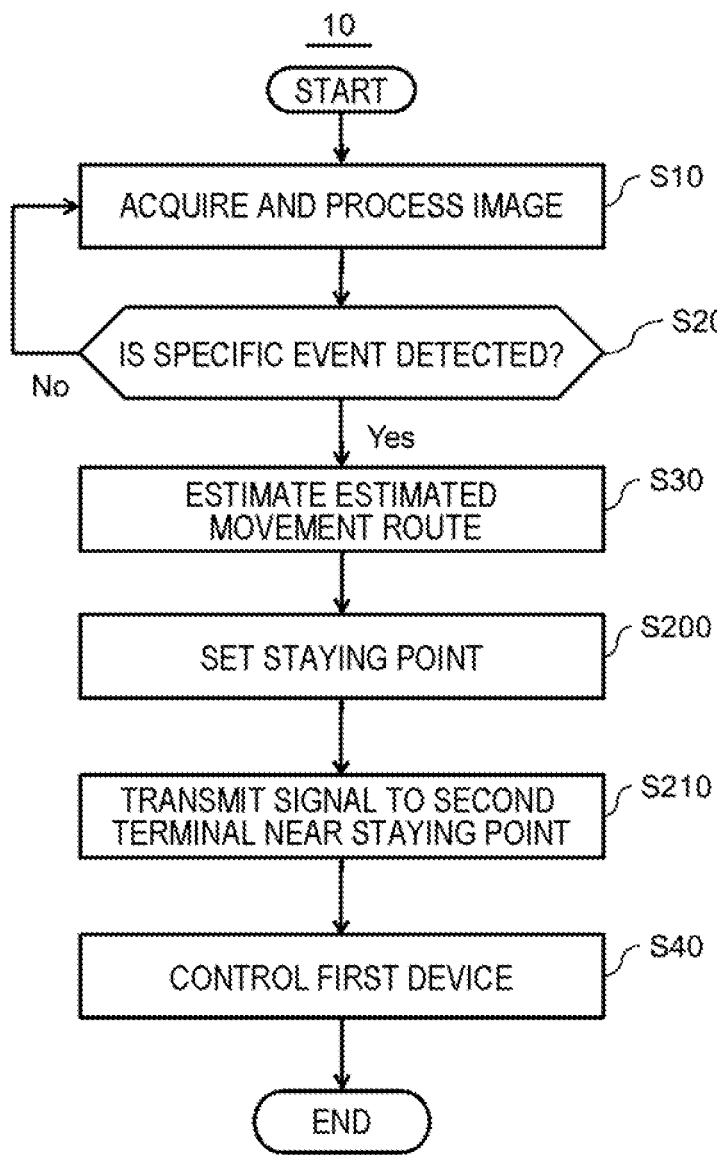
FIG. 10 It is a flowchart illustrating a fifth example of the processing performed by the control apparatus.

FIG. 10 is a flowchart illustrating a fifth example of the processing performed by the control apparatus 10. The example illustrated in this figure is the same as the example illustrated in FIG. 9, except that, instead of steps S202 and S204, the second apparatus 50 near the staying point is determined, and a signal for causing the second apparatus 50 to perform a predetermined output is transmitted (step S210). An example of a method of determining the second apparatus 50 serving as a transmission destination is as explained with reference to FIG. 2.

Note that, in this figure, the processing illustrated in steps S202 and S204 in FIG. 9 may be performed between step S200 and step S210 or between step S210 and step S40.

As described above, according to the present example embodiment, by using the control apparatus 10, it is possible to increase a possibility that the actual movement route of the vehicle or the person coincides with the estimated movement route.

Although the example embodiments of the present invention have been described above with reference to the drawings, these are examples of the present invention, and various configurations other than the above may be adopted.

Further, in the plurality of flowcharts used in the above-described explanation, a plurality of steps (processes) are described in order, but an execution order of the steps to be executed in each example embodiment is not limited to the order described. In each example embodiment, the order of the steps illustrated can be changed within a range that does not interfere with the contents. Further, the above-described example embodiments can be combined within a range in which the contents do not conflict with each other.

Some or all of the above-described example embodiments may be described as the following supplementary notes, but are not limited thereto.

1. A control apparatus including:

an image processing unit that detects occurrence of a specific event by processing an image;

a movement route estimation unit that determines an object being a person and/or a vehicle being involved in the specific event and estimates an estimated movement route of the object; and a control unit that that controls a device in order to guide the object according to the estimated movement route.

2. The control apparatus according to the above 1, wherein the device is at least a part of a traffic system for controlling movement of a person and/or a vehicle.

3. The control apparatus according to the above 1 or 2, wherein the control unit controls the device when at least one of a level of importance of the specific event and the estimated movement route satisfies a criterion.

4. The control apparatus according to the above 3, wherein the image processing unit generates information necessary for generating the importance level or the importance level by processing the image.

5. The control apparatus according to the above 3, wherein the criterion is that a specific region is included in the estimated movement route.

6. The control apparatus according to any one according to the above 1 to 5, further including a point setting unit that sets a staying point being a position at which the object is caused to stay in the estimated movement route, wherein the control unit controls the device in such a way that the object stays at the staying point.

7. The control apparatus according to the above 6, further including a first information transmission unit that generates recommended route information indicating a recommended movement route from a current position of an investigation executor to the staying point, the investigation executor being a person to investigate the object, and transmits the recommended route information to a terminal possessed by the investigation executor.

8. The control apparatus in the control apparatus according to the above 6 or 7, further including a second information transmission unit that determines an object person whose current position satisfies a criterion, and transmits at least one of information indicating a position of the staying point and information relating to the object to a terminal possessed by the object person.

9. The control apparatus according to any one of the above 6 to 8, wherein the control unit determines an object apparatus being an output apparatus in which a position based on the staying point satisfies a criterion, and performs processing for causing the object apparatus to perform a predetermined output.

10. A control apparatus including:

an image processing unit that detects occurrence of a specific event by processing an image;

a movement route estimation unit that determines an object being a person and/or a vehicle being involved in the specific event, and estimates an estimated movement route of the object;

an importance level determination unit that determines an importance level of the specific event; and a control unit that controls at least a part of a traffic system for controlling movement of a person and/or a vehicle on a road, wherein the control unit controls the at least part by using the estimated movement route when the importance level satisfies a criterion, and controls another device different from the at least part when the importance level does not satisfy a criterion.

11. The control apparatus according to the above 10, wherein the another device is an output apparatus on the estimated movement route.

12. The control apparatus according to the above 10, wherein the another device is an unmanned aerial vehicle.

13. A control method comprising, by a computer to perform:

image processing of detecting occurrence of a specific event by processing an image;

movement route estimation processing of determining an object being a person and/or a vehicle being involved in the specific event, and estimating an estimated movement route of the object; and control processing of controlling a device in order to guide the object according to the estimated movement route.

14. The control method according to the above 13, wherein the device is at least a part of a traffic system for controlling movement of a person and/or a vehicle.

15. The control method according to the above 13 or 14, wherein the control processing includes, by the computer, controlling the device when at least one of an importance level of the specific event and the estimated movement route satisfies a criterion.

16. The control method according to the above 15, wherein the image processing includes, by the computer, processing the image and thereby generating information necessary for generating the importance level or the importance.

17. The control method according to the above 15, wherein the criterion is that a specific region is included in the estimated movement route.

18. The control method according to any one of the above 13 to 17, further including, by the computer:

performing point setting processing of setting a staying point being a position at which the object is caused to stay in the estimated movement route, and controlling, in the control processing, the device in such a way that the object stays at the staying point.

19. The control method according to the above 18, further including, by the computer, performing first information transmission processing of generating recommended route information indicating a recommended movement route from a current position of an investigation executor to the staying point, the investigation executor being a person to investigate the object, and transmitting the recommended route information to a terminal possessed by the investigation executor.

20. The control method according to the above 18 or 19, further including, by the computer, performing second information transmission processing of determining an object person whose current position satisfies a criterion, and transmitting at least one of information indicating a position of the staying point and information relating to the object to a terminal possessed by the object person.

21. The control method according to any one of the above 18 to 20, wherein the control processing includes, by the computer, determining an object apparatus being an output apparatus whose position based on the staying point satisfies a criterion, and performing processing of causing the object apparatus to perform a predetermined output.

22. A control method including, by a computer to perform:

image processing of processing an image and thereby detecting occurrence of a specific event;

movement route estimation processing of determining an object being a person and/or a vehicle being involved in the specific event, and estimating an estimated movement route of the object;

importance level determination processing of determining an importance level of the specific event; and control processing of controlling at least a part of a traffic system for controlling movement of a person and/or a vehicle on a road, wherein the control processing includes, by the computer:

controlling the at least part by using the estimated movement route when the importance level satisfies a criterion; and controlling another device different from the at least part when the importance level does not satisfy a criterion.

23. The control method according to the above 22, wherein
the another device is an output apparatus on the estimated movement route.

24. The control method according to the above 22, wherein
the another device is an unmanned aerial vehicle.

25. A program causing a computer to perform:
an image processing function of processing an image and thereby detecting occurrence of a specific event;
a movement route estimation function of determining an object being a person and/or a vehicle being involved in the specific event, and estimating an estimated movement route of the object; and
a control function of controlling a device in order to guide the object according to the estimated movement route.

26. The program according to the above 25, wherein the device is at least a part of a traffic system for controlling movement of a person and/or a vehicle.

27. The program according to the above 25 or 26, wherein the control function controls the device when at least one of an importance level of the specific event and the estimated movement route satisfies a criterion.

28. The program according to the above 27, wherein the image processing function processes the image and thereby generates information necessary for generating the importance level or the importance level.

29. The program according to the above 27, wherein the criterion is that a specific region is included in the estimated movement route.

30. The program according to any one of the above 25 to 29, further causing the computer to have a point setting function of setting a staying point being a position at which the object is caused to stay in the estimated movement route, wherein
the control function controls the device in such a way that the object stays at the staying point.

31. The program according to the above 30, further causing the computer to have
a first information transmission function of generating recommended route information indicating a recommended movement route from a current position of an investigation executor to the staying point, the investigation executor being a person to investigate the object, and transmitting the recommended route information to a terminal possessed by the investigation executor.

32. The program according to the above 30 or 31, further causing the computer to have
a second information transmission function of determining an object person being a person whose current position satisfies a criterion, and transmitting at least one of information indicating a position of the staying point and information relating to the object to a terminal possessed by the object person.

33. The program according to any one of the above 30 to 32, wherein
the control function determines an object apparatus being an output apparatus whose position based on the staying point satisfies a criterion, and performs processing of causing the object apparatus to perform a predetermined output.

34. A program causing a computer to have:
an image processing function of processing an image and thereby detecting occurrence of a specific event;
a movement route estimation function of determining an object being a person and/or a vehicle being involved in the specific event, and estimating an estimated movement route of the object;
an importance level determination function of determining an importance level of the specific event; and
a control function of controlling at least a part of a traffic system for controlling movement of a person and/or a vehicle on a road, wherein the control function
controls the at least part by using the estimated movement route when the importance level satisfies a criterion, and
controls another device different from the at least part when the importance level does not satisfy a criterion.

35. The program according to the above 34, wherein
the another device is an output apparatus on the estimated movement route.

36. The program according to the above 34, wherein
the another device is an unmanned aerial vehicle.

This application is based upon and claims the benefit of priority from Japanese patent application No. 2021-067690, filed on Apr. 13, 2021, the disclosure of which is incorporated herein in its entirety by reference.

REFERENCE SIGNS LIST

10 Control apparatus
20 First terminal
22 Second terminal
30 Imaging apparatus
40 First device
50 Second apparatus
60 Object
70 Center apparatus
110 Image processing unit
120 Movement route estimation unit
130 Importance level determination unit
140 Control unit
150 Point setting unit
160 First information transmission unit
170 Second information transmission unit
180 Information storage unit

What is claimed is:
1. A control apparatus comprising:
at least one memory configured to store instructions; and
at least one processor configured to execute the instructions to perform operations, the operations comprising:
processing an image and thereby detecting occurrence of a specific event;
determining an object being a person and/or a vehicle being involved in the specific event;
estimating an estimated movement route of the object;
controlling a device in order to guide the object according to the estimated movement route;
setting a staying point being a position at which the object is caused to stay in the estimated movement route;
determining an object person whose current position satisfies a criterion and transmitting at least one of information indicating a position of the staying point and information relating to the object to a terminal possessed by the object person; and
controlling the device in such a way that the object stays at the staying point.

2. The control apparatus according to claim 1, wherein the device is at least a part of a traffic system for controlling movement of a person and/or a vehicle.

3. The control apparatus according to claim 1, wherein the operations further comprise controlling the device when at least one of an importance level of the specific event and the estimated movement route satisfies a criterion.

4. The control apparatus according to claim 3, wherein the operations further comprise processing the image and thereby generating the importance level or information necessary for generating the importance level.

5. The control apparatus according to claim 3, wherein the criterion is that a specific region is included in the estimated movement route.

6. The control apparatus according to claim 1, wherein the operations further comprise generating recommended route information indicating a recommended movement route from a current position of an investigation executor to the staying point, the investigation executor being a person to investigate the object, and transmitting the recommended route information to a terminal possessed by the investigation executor.

7. A control method performed by a computer, the control method comprising,
   processing an image and thereby detecting occurrence of a specific event;
   determining an object being a person and/or a vehicle being involved in the specific event, and estimating an estimated movement route of the object;
   controlling a device in order to guide the object according to the estimated movement route;
   performing point setting processing of setting a staying point being a position at which the object is caused to stay in the estimated movement route;
   determining an object person whose current position satisfies a criterion, and transmitting at least one of information indicating a position of the staying point and information relating to the object to a terminal possessed by the object person; and
   controlling the device in such a way that the object stays at the staying point.

8. The control method according to claim 7, wherein the device is at least a part of a traffic system for controlling movement of a person and/or a vehicle.

9. The control method according to claim 7, further comprising controlling the device when at least one of an importance level of the specific event and the estimated movement route satisfies a criterion.

10. The control method according to claim 9, further comprising processing the image and thereby generating the importance level or information necessary for generating the importance level.

11. The control method according to claim 9, wherein the criterion is that a specific region is included in the estimated movement route.

12. The control method according to claim 7, further comprising,
   generating recommended route information indicating a recommended movement route from a current position of an investigation executor to the staying point, the investigation executor being a person to investigate the object, and transmitting the recommended route information to a terminal possessed by the investigation executor.

13. A non-transitory computer-readable medium storing a program for causing a computer to perform operations, the operations comprising:
   processing an image and thereby detecting occurrence of a specific event;
   determining an object being a person and/or a vehicle being involved in the specific event, and estimating an estimated movement route of the object;
   controlling a device in order to guide the object according to the estimated movement route;
   setting a staying point being a position at which the object is caused to stay in the estimated movement routes;
   determining an object person whose current position satisfies a criterion, and transmitting at least one of information indicating a position of the staying point and information relating to the object to a terminal possessed by the object person; and
   controlling the device in such a way that the object stays at the staying point.

14. The non-transitory computer-readable medium according to claim 13, wherein
   the operations further comprise the device when at least one of an importance level of the specific event and the estimated movement route satisfies a criterion.

15. The non-transitory computer-readable medium according to claim 13,
   wherein the operations further comprise generating recommended route information indicating a recommended movement route from a current position of an investigation executor to the staying point, the investigation executor being a person to investigate the object, and transmitting the recommended route information to a terminal possessed by the investigation executor.

* * * * *